Nov. 30, 1937.　　　　　I. E. COFFEY　　　　　2,100,837
SPARK METER
Filed Oct. 22, 1931　　　2 Sheets-Sheet 1
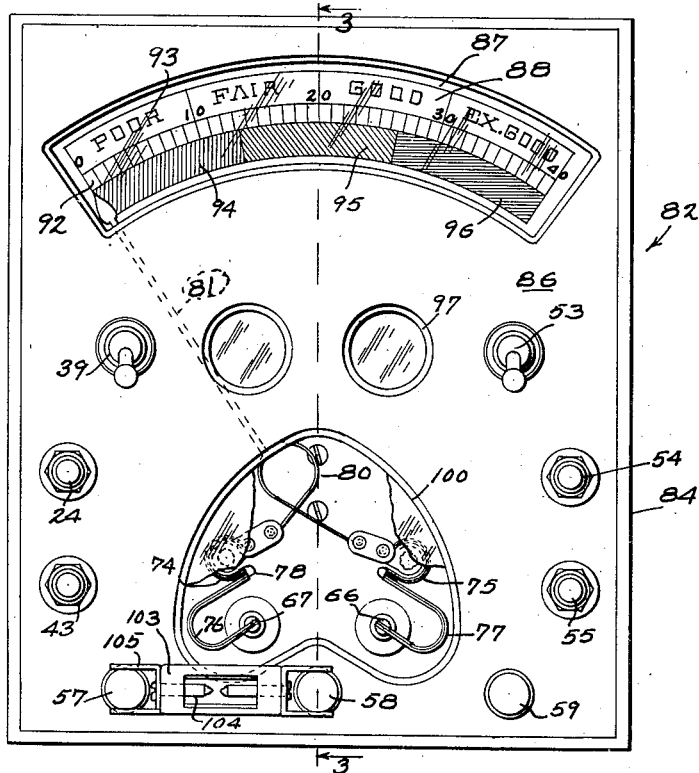
FIG. I.
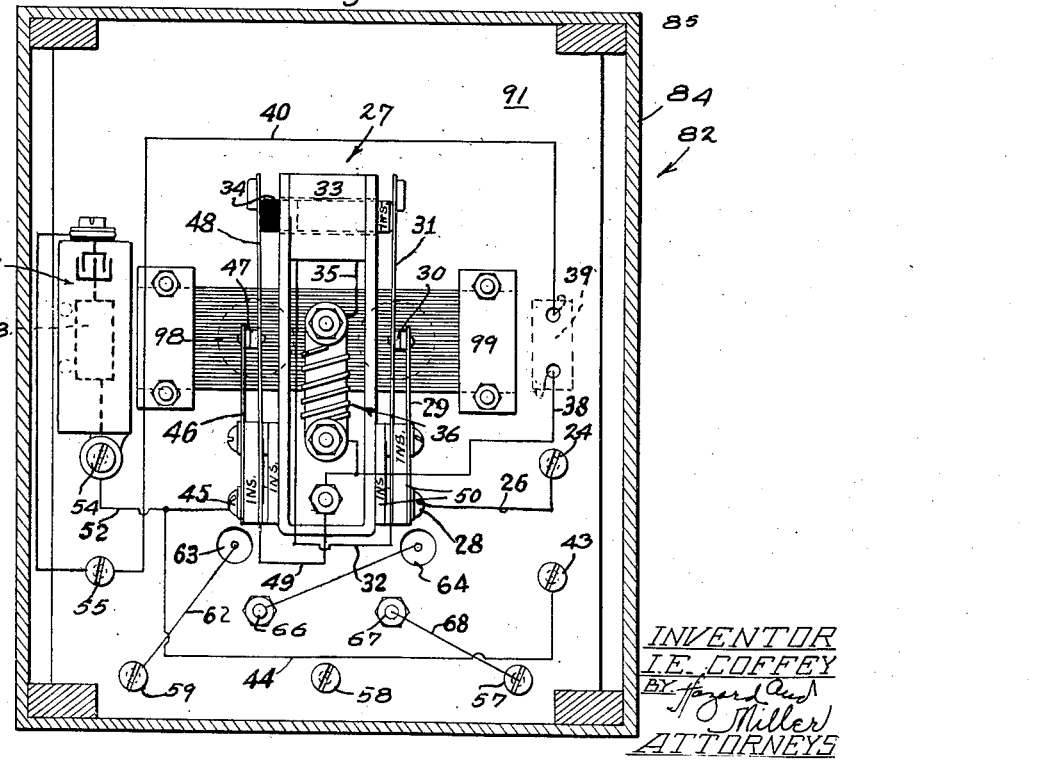
FIG. 2.
INVENTOR
I. E. COFFEY
BY Hazard and
Miller
ATTORNEYS Nov. 30, 1937.                I. E. COFFEY                2,100,837
                              SPARK METER
                         Filed Oct. 22, 1931            2 Sheets-Sheet 2
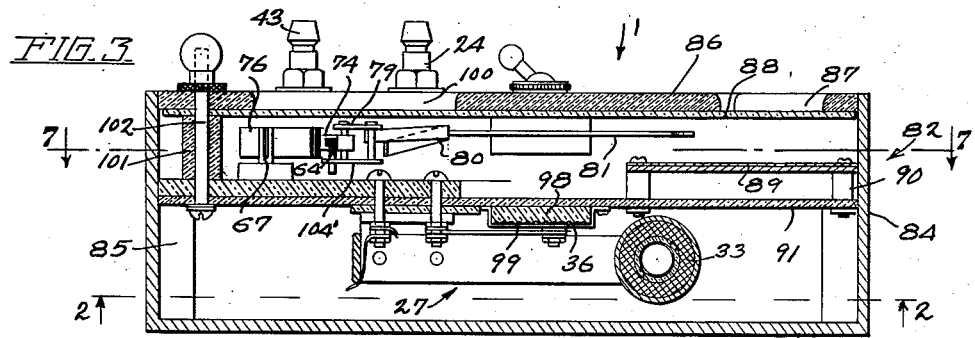
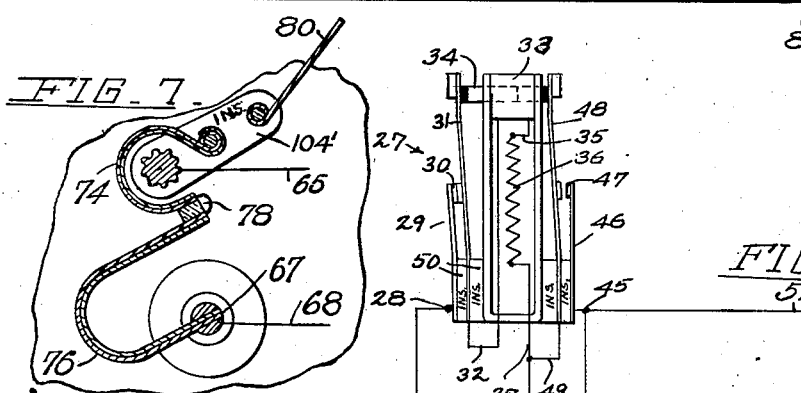
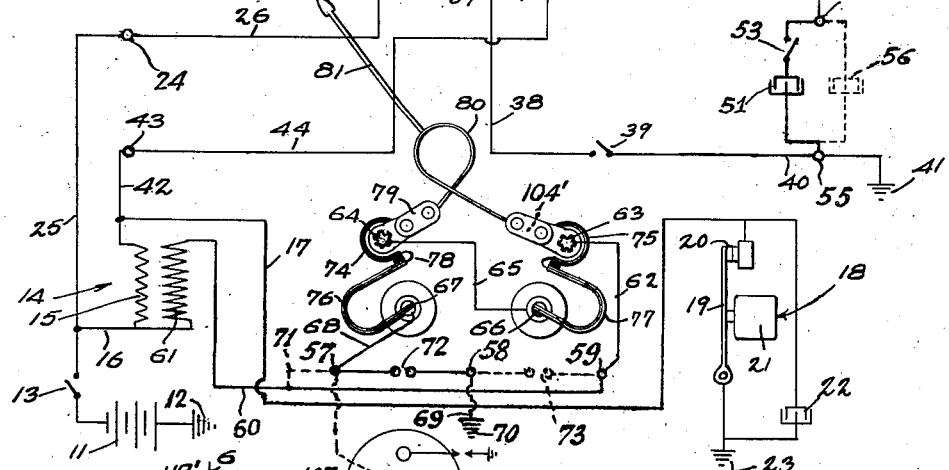
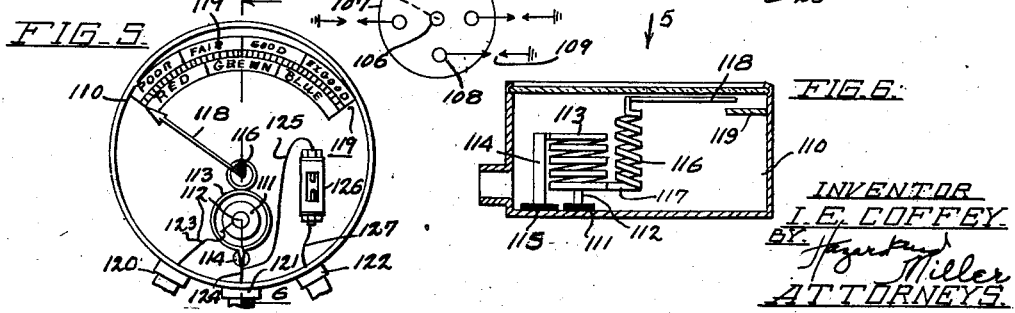

Patented Nov. 30, 1937

2,100,837

UNITED STATES PATENT OFFICE 2,100,837

SPARK METER

Irven E. Coffey, Playa del Rey, Calif.

Application October 22, 1931, Serial No. 570,447

12 Claims. (Cl. 175—183)

I designate my invention as a spark meter as I utilize the heat generated in an electric arc in making electrical tests.

An object and feature of my invention is an instrument which may in its result be used to test the efficiency of the ignition spark at the spark plug of an internal combustion engine. In its broader aspect, however, an object and feature of my invention and instrument is a mechanism for testing the transformer or so-called coil for developing the high tension current used in the spark plugs, also the condenser utilized in connection with the circuit to the spark plugs. With such an instrument I may obtain readings with the engine not running but drawing power from the battery indicating the general condition of the transformer coil and the condenser relative to what would be considered good output for these parts of the ignition system.

Another object and feature of my invention relates to the instrument in its use with the engine running and thereby determining the efficiency of the ignition system including the transformer, the condenser, and the spark plugs.

My instrument is designed so that a variety of connections may be made whereby individual spark plugs may be tested to ascertain if they are working to their best efficiency in giving a hot spark.

Another feature dealing with the mechanical construction of my invention is a meter which will indicate the relative temperatures of the spark or sparks in the ignition system of an internal combustion engine in which a test may be made with the spark plugs out of the circuit showing a temperature developed with the current passing through the transformer coil and the condenser of the engine or, if desired, through a standard condenser by which comparisons can be made between the conditions with the standard condenser and that of the ignition system.

A further object and feature of my invention in a meter of this type is operating the meter due to changes of temperature of sparks generated in the instrument, such sparks being in the ignition circuit of the engine whereby the heating sparks in the instrument give an indication of the type of spark in the ignition system of the engine. To obtain this I arrange the recording element of the instrument, which is usually a pointer, operatively connected to thermostatic strips or coils, which strips or coils are heated by sparks developed in the circuit of the ignition system. Hence, when the ignition system has a poor spark the temperature developed by the spark in the instrument will be low and the indication will show a poor result. However, if the spark in the instrument is of a high temperature the pointer moving up the scale will indicate that the spark in the ignition system is in good condition and developing a high temperature to give satisfactory ignition to the fuel.

My invention, as to the thermostatic strip, the temperature indicator operated thereby, and the spark electrodes, constitutes a direct reading ammeter in that it translates into heat the electric spark between a spark electrode and the adjacent strip and such strip reacts to a change of temperature. The spark is a direct factor of voltage and current, that is, amperage.

Another detail object and feature of my invention is forming a compensation for changes of atmospheric temperature so that no matter what these changes may be within practical limits, the pointer will always record zero when the instrument is not in use.

An important feature of my invention is that the thermostatic strips compensate one another for atmospheric and internal temperatures developed when there is no arc between an exterior spark point and one of the strips so that the pointer normally would indicate zero. Manifestly, when the device has been in use for some time and the thermostatic strips are enclosed in a case, the interior of this case becomes heated. But even under these conditions the pointer will indicate zero; but when the spark is actually jumping between the exterior spark point and one of the strips the temperature of this latter strip is materially increased, thus causing a movement of the pointer.

Another important feature of my invention is that the deflection of the thermostatic strips is caused but little by the current passing through the strips but practically entirely by the heat of the spark jumping to the adjacent strip. By the use of my spark meter a person may ascertain whether or not the current is flowing in the proper or best direction through the spark plugs of the engine. This is indicated by the pointer moving about the scale and also by the sharp point of the sparks on the thermostatic strips where they jump from the spark electrodes.

My instrument is illustrated in the accompanying drawings, in which:

Fig. 1 is a face or plan view of a general instrument as taken in the direction of the arrow 1 of Fig. 3.

Fig. 2 is a reverse view taken on the section line 2—2 of Fig. 3.

Fig. 3 is a vertical section taken on the line 3—3 of Fig. 1 in the direction of the arrows.

Fig. 4 is an electrical wiring diagram, showing the armature and breaker points in their extreme left hand position.

Fig. 5 is a plan of a simplified type of instrument taken in the direction of the arrow 5 of Fig. 6.

Fig. 6 is a diagrammatic vertical section as if taken on the line 6—6 of Fig. 5 in the direction of the arrows, certain parts being shown in elevation.

Fig. 7 is a detail horizontal section taken on the line 7—7 of Fig. 3 in the direction of the arrows on a larger scale.

Referring first to the wiring diagram of Fig. 4. This illustrates the battery 11 of the ignition system having one side connected to ground 12, a main switch 13, a transformer coil 14 having a primary winding 15, there being a connection 16 from the primary of the coil to the switch 13. The primary of the coil of the transformer also has a lead 17 which connects to the timing assembly 18 of the ignition system, this timing assembly being shown as having a breaker arm 19 with adjustable contact points 20 and a rotatable timer cam 21 for opening and closing the contact points 20. A condenser 22 leads to another ground connection 23.

My instrument is provided with a battery terminal 24 and a lead 25, which may connect to the main battery switch 13. From the battery terminal there is a lead 26 to a make and break vibrator 27 used to generate the high tension current in the instrument as shown. This lead 26 has a terminal 28 connecting to one resilient arm 29 of the interrupter points 30, one being on the resilient arm 29 and the other on the resilient arm 31. From the arm 31 there is a lead 32 which connects to the magnetic coil 33 which is energized to vibrate the armature 34. Another lead 35 extends from the coil 33 through a resistance 36 and a lead 37 and another lead 38 to an instrument set switch 39 and from such switch there is a lead 40 to terminal 55, to which may be connected another ground connection 41.

At the end of the coil opposite to members 29, 30, and 31 are corresponding members 46, 47, and 48. The resilient arms 46 and 31 are biased toward each other, whereby the armature while at rest is held in mid position between them. The armature 34 is loosely mounted in the coil 33 and is formed of magnetic metal with insulation at each end, the insulation at the right-hand end with respect to Figure 4 being substantially thicker than that at the other end whereby the normal position of the metal portion of the armature, when the parts are at rest, will be unbalanced with respect to the coil 33 so that when the current is turned on, the armature 34 will be drawn into the coil, permitting inwardly biased resilient arm 31 to separate the contact points 30. Under the influence of the coil and the resilience of the members 31 and 48, which are weighted at the ends, the armature vibrates in the coil from one side to the other. The right-hand end of the armature acts against the arm 48. When the circuit through the coil 33 is closed, the movement of the armature to the right (still with respect to Figure 4) permits the member 31 to move sufficiently to separate the contacts 30 thus breaking the circuit through the coil 33. After the circuit is broken, the reaction of the resilient arm 48 moves the parts back to the position shown in Figure 4, thus opening contacts 47 and reclosing the circuit through contacts 30 and coil 33.

A second connection is made from the primary of the coil through a lead 42 to a terminal post 43. A lead 44 from terminal post 43 then connects at 45 to the arm 46 and the interrupter points 47, one being on the arm 46 and the other on the arm 48. A lead 49 extends from the arm 48 to the leads 37 and 38. The various arms are separated from each other and from the vibrator mounting by insulation 50.

The instrument has a condenser 51 which is carefully standardized and should be of substantially the capacity of the condenser used in the ignition circuit of the usual internal combustion engine. Condenser 51 and a switch 53 are bridged across terminal 55 and terminal 54, the latter connected to arm 46 by lead 52. When switch 53 is opened to cut condenser 51 out of circuit, the engine ignition condenser may be tested by bridging it across terminals 55—54 in place of condenser 51, as indicated in dotted lines at 56.

The instrument box or case is provided with three terminals 57, 58 and 59. There is a high tension lead 60 from the secondary 61 of the transformer to the terminal 59 and from this there is a flexible lead 62 to a fixed spark electrode 63. A second fixed spark electrode 64 is connected by a flexible lead 65 to a terminal 66. A second terminal 67 has a flexible lead 68 to the terminal 57. A ground connection 69 leads from the terminal 58 to ground at 70. A spark gap 72 is inserted between terminals 57 and 58. For reversing the direction of secondary current through the device, connection 60 is shifted from 59 to 57, and gap 72 from terminals 57—58 to terminals 59—58, as indicated by dotted lines 71 and 73, respectively. This removable and insertable spark gap is used as a substitute for the spark plugs when a test is being made without such plugs being operable.

The heating elements comprise first thermostatic strips 74 and 75, which are connected to secondary thermostatic strips 76 and 77. The latter strips are rigidly connected to terminals 66 and 67. The two strips are rigidly connected together by a suitable connection 78 and are formed of thermostatic metal arranged to expand in opposite directions in order to compensate for changes in temperature, these being made of such a character so that under changes of atmospheric temperature within a range in which the instrument might be used, the pointer of the instrument hereinunder detailed will remain at zero.

The strips 74 and 75 are so made and curved that they are for practical purposes concentric to the sparking electrodes 64 and 63. Rigidly connected to the ends of each of the thermostatic strips 74 and 75 there is a clamping block 79, to which clamping blocks there are rigidly connected the opposite ends of a looped spring 80. This looped spring is preferably formed of flat metal with the two ends working freely over each other, and to the loop there is attached a pointer or hand 81, this being the indicating hand of the instrument.

The loop 80 connected to the thermostatic strips 74 and 75 operates to magnify the relative movement of these strips. For instance, the ends of the strips have a certain movement communicated thereto by the expansion and contraction of such strips, and the end of the pointer 81 attached to the loop has a rotating movement relative to the center of such loop and this gives an indication amplifying many times the actual movement of the ends of the thermostatic strips.

Manifestly, the electrical connections which I have illustrated and the switches may be utilized in a convenient installation in any suitable manner. However, I have designed a relatively simple and attractive case designated generally by the numeral 82 containing the various electrical connections of the instrument with suitable terminals for connection to the electrical parts of the engine. This case has a bottom 83 with sides 84 with corner struts 85. A top panel 86 is provided with an arcuate opening 87, there being, preferably, a glass plate 88 below the panel and the openings and below the opening 87 there is a scale 89 mounted on supports 90 from a lower panel 91. This latter panel rests on the posts 85. The scale has graduations 92 having numerals opposite these graduations, and also has sections 93 with the words "Poor", "Fair", "Good", and "Extra good". There are also three sections 94, 95, 96 of different colors, preferably red, green, and blue, respectively. The pointer 81 swings over this scale in operation of the instrument. The upper panel has two small openings 97, these openings being directly over the interrupter points 30 and 47, there being, preferably, some corrugated glass 98 supported from clamps 99 on the lower panel so that the spark from these points will be diffused when observed through the windows 97. A large opening 100 exposes the thermostatic strips, the spark points 63 and 64; therefore, the sparks jumping between these points and the smaller thermostatic strips 74 and 75 may be visible through the window 100. The various switches and terminals designated in Fig. 4 are shown on Figs. 1 and 3, these being suitably designed for detachably connecting various lead wires to the terminals.

In order to secure the top panel 86 and the lower panel 91 together, there are a series of spacing blocks 101 with bolts 102 passing therethrough. Certain of these bolts function as the terminals 57, 58 and 59.

The spark gap 72 is illustrated as having an insulating body 103 with the two spark points 104 mounted therein and clamps 105 to engage the terminals 57, 58 or 59. This spark gap 72 is designed to absorb in the spark substantially as much electrical energy as in the spark plugs of the engine for igniting the gas and, therefore, is intended to be substantially the equivalent of the set of spark plugs of a standard engine. By shifting gap 72 from terminals 57 and 58 to terminals 59 and 58, and shifting connection 60 from terminal 59 to terminal 57, the current direction may be tested. When the spark is jumping in the correct direction a greater amount of heat is developed at the thermostatic strip and the pointer 81 gives a high reading. Also, the correct direction may be observed by noting the spark between the electrodes 63 and 64 and the thermostatic strips 75 and 74 adjacent thereto. The spark should be from the electrode to the strip and indicates on the strip by a bright spot of light on such strip. Should the spark jump in the wrong direction, the greatest amount of heat will be developed at the center sparking point, which is not thermostatic, and the pointer 81 will show a much lower reading. It is necessary to use flexible leads 62 and 65 to the electrodes 63 and 64 as these are mounted on insulating bases 104' rigidly connected to the clamping blocks 79. There is, therefore, a slight movement of these clamping blocks and the support for the electrodes as the thermostatic strips expand and contract and, hence, as the spring loop and pointer move, but the electrodes are always near the center of the thermostatic strips 74 and 75.

Referring again to the illustration of Fig. 4, all of the electrical connections shown below the terminals 24 to 43, 57, 58, 59, 54, 55, may be considered as pertaining to the electrical equipment of the engine and lead wires used therefrom to my instrument.

Presuming it is desired to make a test of the ignition system of the engine with the engine stopped and no current passing through the spark plugs, the timer cam 21 may be operated to open the contact points 20, or these may be mechanically opened and insulated as by inserting a sheet of insulation. A connection is then made from the battery. This may be from one side of the engine switch 13 to the battery terminal 24, such being indicated by the lead 25. A grounding connection is then made, from the ground terminal 55 to the ground 41, this being any part of the engine frame.

The instrument set switch 39 is then closed. The action then is as follows:

The low tension battery current through the leads 25 and 26 and the interrupter points 30, normally closed, energizes the magnetic interrupter coil 33, causing the winding of this to be energized to actuate the vibrating armature 34. The current of this circuit has a return to ground through the lead 37 and 38, set switch 39 and 40 to the ground 41. The low tension current through the primary 15 of the transformer coil 14 of the engine has a circuit through the lead 42, the primary terminal 43, lead 44, connections 45 and 46, to the interrupter points 47 which are normally closed, for energizing the transformer of the car. The return to ground is through the arm 48, the leads 49, 38, and 40 to the ground 41. This is presuming that the condenser switch 53 is open to make a test of a condenser at 56. The interrupter 47 thus causes an energizing of the secondary 61 of the transformer coil of the engine, giving a circuit through the high tension lead 60, the flexible lead 62, through the electrode 63, the thermostatic strips 75 and 77, flexible lead 65, to the electrode 64, thence, the thermostatic strips 74 and 76, the lead 68 to the terminal 57 and thence by the spark gap 72 to the terminal 58 and by the connection 69 to the ground 70. This, therefore, gives what may be termed an artificial spark circuit and in view of the heat generated by the sparks between the electrodes 63 and 64 and the adjacent thermostatic strips 75 and 74 causes a flexing of such strips and, hence, of the spring 80 and the movement of the arm 81. By this means a test may be made of the efficiency of the transformer coil of the engine.

With the engine still not operating and the timer contacts open, test of a condenser 56 may be made by means of the windows 97 in the top panel 86. These are utilized to observe the sparks at interrupter points 30 and 47, indicating conditions in the respective circuits of the interrupter coil 33, and of the transformer primary 15. The sparks are diffused by corrugated glasses 98 into streaks of light, allowing ready interpretation of the efficiency of condenser 56 in suppressing the spark at interrupter contacts 47. The spark at each of these points 30 and 47 is observed through windows 97. When the condenser under test is normal, these will appear to the eye the same color and intensity through both windows. On account of the sparks being diffused by the corrugated glass 98, the sparks have an elongated appearance. If the condenser under test is weak or bad, the sparks at 47 will increase in brilliancy. Under this latter condition of a weak test condenser, the reading on scale 92 will be less than with a standard condenser.

When it is desired to test the ignition set of the engine with the engine operating, the external lead 25 is removed from the battery terminal 24, the lead 42 may be left connected to the primary terminal 43 so that the standardized condenser 51 may be thrown in and out of the circuit as desired. The spark gap 72 is removed. The secondary 61 of the transformer coil 14 is connected to a terminal 59, and a lead connection is made from the terminal 57 to the center point 106 of the distributor 107 of the engine, which distributor is indicated as having contacts 108 with leads to the spark plugs 109. The electrical action is then as follows:

The current from the battery is indicated as passing through the primary 15 of the transformer coil 14 through the low tension lead 17 to the timer 18. The make and break of the primary circuit by the timer causes the secondary 61 to send high voltage current through the terminal 59, the flexible lead 62, the electrode 63, the thermostatic strips 75 and 77, the flexible lead 65, the electrode 64, the thermostatic strips 74 and 76, the connection 68 to the terminal 57, and from thence to the distributor, the spark plugs in the engine and ground. The heat developed by the sparks at the electrodes 63 and 64 actuates the pointer 81, and a comparison of readings may be obtained with the engine running under its own ignition and in a case in which the engine is not running. With this connection, also, the condenser 51 may be placed in the circuit by closing the condenser switch 53 or, if desired, this switch may be opened and a condenser for test may be installed between the terminals 54 and 55. In these two latter tests it is advisable to disconnect the condenser 22 of the engine.

The spark from the spark plug in the engine is hotter when this spark jumps from the point of the spark plug to the metal of the engine. This is due in great part to the capacity effect of the metal parts of the car, which form a ground. This is a matter well known in connection with automobile engineering. The connections from the secondary 61 of the transformer coil 14 may be reversed to note the different results of operating the current in different directions through the spark plugs.

When the device of Figs. 1 through 4 is used to test the single spark plugs of the engine with the engine operating, the connection to the interrupters is not used and the spark plug to be tested is placed in the circuit with terminals 57 and 59. This may be done by taking a lead from the spark plug connection on the distributor to the terminal 59 and from the terminal 57 to the spark plug. This will give the current through the spark plug in the correct direction provided the transformer coil of the ignition circuit is properly connected in the ignition circuit.

In the simplified instrument of Figs. 5 and 6 I show a suitable case 110 having an insulating support 111 at the bottom, from which there is supported a vertical sparking electrode 112. This sparking electrode is surrounded by a first thermostatic coil strip 113, such strip having a post 114 mounted on the insulating base 115. A second thermostatic coil 116 is connected to the first coil by a strip 117. A pointer arm 118 is connected to the second coil and operates over a scale 119. This scale may have the various graduations 119' similar to the instrument of Fig. 1. The thermostatic coils 113 and 116 are made with the thermostatic metal operating differentially so as to compensate for changes in the atmospheric temperature within ordinary limits and thus under normal conditions hold the pointer 118 at the zero position of the scale.

There are three terminals 120, 121, and 122 connected to the instrument, to which portable leads may be attached. An internal connection 123 leads from 120 to the spark electrode, 112; a lead 124 from 121 to the post 114 of the thermostatic coils, a connection 125 from the post 114 to a spark gap device 126, and a connection 127 from this spark gap to 122.

In the operation of the device of Figs. 5 and 6, when a test is made with the engine running the high tension connection from the transformer coil to the center point of the distributor can be removed and a connection made from the terminal 120 to the high tension side of the transformer and from 121 to the high tension center point of the distributor. Then when the engine is operated under its own power a spark jumps between the spark electrode 112 and the encircling thermostatic coil 113, heating this coil which is designed to actuate the pointer 118 through the medium of coil 116. If the coils 113 and 116 are at the same temperature, the pointer will always point to zero on the scale. Thus this pointer always points at zero when influenced only by atmospheric temperatures and temperatures developed adjacent the case which heat both coils, such as the increased temperature in the case and container confining the coils 113 and 116. However, if coil 113 is heated by the arc to a higher temperature than coil 116, then the pointer will move to the right across the scale in proportion to the difference in temperature of coils 113 and 116. This gives a test of the whole ignition system of the engine, including the transformer, condenser and spark plugs.

When it is desired to test a transformer coil for its efficiency without operating the engine, a connection may be made from the terminal 120 to the secondary of the transformer and from the terminal 122 to ground. The points of the timer may then be rapidly opened and closed or the primary circuit of the transformer broken in any suitable manner such as by power driven interrupters used by repair shops for this purpose in order to give a high tension current in the secondary. The circuit then includes the connection 123 to the electrode 112, thence to the thermostatic strip 113, the connection 125 to the spark gap 126 by 127 to the ground connecting terminal 122. This spark gap takes the place of the spark plugs and the heat developed in this circuit in causing the movement of the hand 118 indicates the condition of the transformer.

I claim:

1. The combination of a pair of spark electrodes, a thermostatic strip positioned adjacent each electrode, a loop spring connected to these strips and having a pointer thereon, and a high tension electric circuit through the strips and the two electrodes to establish sparks between the electrodes and the adjacent strips, the change of temperature of the strips causing a movement of the spring and hence of the pointer.

2. In a device as described, an instrument having a pair of interrupters for low tension current, a battery terminal, and a terminal for a transformer primary, a connection from the battery terminal to one interrupter, and a connection from the primary terminal to the other interrupter, a ground terminal, and a common connection through a switch to the ground terminal, a sparking electrode, a thermostatic strip adjacent thereto, a pointer operatively connected to the strip, a plurality of high tension terminals with connections from at least two of said terminals to the strip and to the sparking electrode, an opening with a window to observe the sparks of the interrupters, and another opening to observe the spark between the spark electrode and the thermostatic strip.

3. In a device as claimed in claim 2, the instrument having an additional terminal for connection of a condenser between such terminal and the ground terminal, and a condenser in the low tension circuit with a switch.

4. In a device as described, an instrument having a case with a top panel, a plurality of terminals thereon, one being for a battery connection, another for a primary on a transformer coil, a third for connection to ground, a fourth for bridging a condenser between such fourth terminal and the ground, and a fifth, sixth, and seventh for high tension currents, a first switch for a low tension circuit connecting to ground, and a second switch in the low tension circuit with a condenser in such circuit, the condenser being below the panel, a vibrator coil with a pair of interrupter points, and connections from the battery terminal to one of the interrupter points and to the coil, another connection from the primary terminal to the other interrupter, and a common connection from the coil through the first switch to the ground terminal, a sparking electrode located below the panel, a thermostatic strip adjacent thereto, a pointer operatively connected to the strip, and connections from at least two of the high tension terminals to the strip and to the sparking electrode, the panel having observation windows to observe the sparks at the interrupter points and between the sparking electrode and the thermostatic strip.

5. In a device as described, an instrument having a spark electrode, a first coil of thermostatic strip metal surrounding said electrode, a second coil of thermostatic strip metal connected thereto, said coils being in a reverse direction to compensate for atmospheric temperatures, a pointer connected to the second coil and operative over a scale, and terminals for connecting the spark electrode and the first coil.

6. In a device as described, an instrument having a solenoid coil, a moving armature therefor, a pair of spring arms actuated by the armature, a pair of conducting arms, a make-and-break spark gap device between each conducting arm and each spring arm, and a glass having light diffusing properties positioned over each spark gap device.

7. The combination of a pair of spark electrodes, a first thermostatic strip positioned adjacent each electrode, a loop spring connected to these strips and having means to indicate a temperature change, circuit connections to each strip and each electrode to cause a spark between each electrode and the adjacent strip, the change of temperature of the strips causing a movement of the spring and indicating a change of temperature.

8. The combination as claimed in claim 7, a second thermostatic strip connected to each first thermostatic strip, the connected strips compensating for temperature changes of the medium surrounding the strips.

9. In a device as described, an instrument having a spark electrode, two curved members of thermostatic strip metal electrically and mechanically connected to produce counter-acting movements under the influence of ambient temperatures, one of said curved members surrounding said electrode, a pointer connected to one end of the thermostatic strip assembly and operative over a scale, and terminals for connecting the spark electrode and the surrounding coil to a source of high tension current.

10. A spark coil testing device comprising a casing, a bimetallic thermostat having one end fixed with respect to said casing and the other end free, a second bimetallic thermostat having one end attached to the free end of the first thermostat and its other end free, a scale, a pointer connected to the free end of the second thermostat and cooperating with said scale, said thermostats being oppositely connected and arranged to eliminate variations in the position of said pointer due to variations in ambient temperature, an electric terminal connected to the first of said thermostats, and an electrode mounted adjacent one of said thermostats in such relation as to form a spark gap between the thermostat and said electrode.

11. A test set comprising a heat responsive device shaped in the arc of a circle, a pointer connected thereto, an electrode centrally mounted within and closely adjacent to said heat responsive device, said heat responsive device being of the bimetallic type, whereby said sparks may jump with equal facility between said electrode and different parts of the thermostatic device.

12. A test set comprising a heat responsive device shaped in the arc of a circle, a pointer connected thereto, an electrode centrally mounted within and closely adjacent to said heat responsive device, said heat responsive device being of the bimetallic type, whereby said sparks may jump with equal facility between said electrode and different parts of the thermostatic device, said parts being constructed and arranged to permit convenient visibility of the spark gap to the operator.

IRVEN E. COFFEY.